US007015162B2

(12) United States Patent
Coster et al.

(10) Patent No.: US 7,015,162 B2
(45) Date of Patent: Mar. 21, 2006

(54) BLUE SODIOCALCIC GLASS

(75) Inventors: Dominique Coster, Templous (BE); Laurent Delmotte, Meeffe (BE); Marc Foguenne, Saint-Denis (BE)

(73) Assignee: Glaverbel, Bruxelles (BE)

( * ) Notice: Subject to any disclaimer, the term of this patent is extended or adjusted under 35 U.S.C. 154(b) by 184 days.

(21) Appl. No.: 10/774,631

(22) Filed: Feb. 10, 2004

(65) Prior Publication Data

US 2004/0259716 A1    Dec. 23, 2004

Related U.S. Application Data

(63) Continuation of application No. 09/914,043, filed as application No. PCT/EP00/01394 on Feb. 21, 2000, now abandoned.

(30) Foreign Application Priority Data

Feb. 24, 1999    (EP) ............................... 99103543

(51) Int. Cl.
  *C03C 3/087*    (2006.01)
  *C03C 4/10*    (2006.01)
(52) U.S. Cl. .................... 501/71; 501/71; 501/904; 501/905

(58) Field of Classification Search ............ 501/70, 501/71, 904, 905
See application file for complete search history.

(56) References Cited

U.S. PATENT DOCUMENTS

| | | |
|---|---|---|
| 5,545,596 A | 8/1996 | Alvarez Casariego et al. |
| 5,688,727 A | 11/1997 | Shelestak et al. |
| 5,780,372 A | 7/1998 | Higby |
| 5,851,940 A | 12/1998 | Boulos et al. |
| 6,103,650 A | 8/2000 | Krumwiede |
| 6,313,053 B1 | 11/2001 | Shelestak |

*Primary Examiner*—Karl Group
*Assistant Examiner*—Elizabeth A. Bolden
(74) *Attorney, Agent, or Firm*—Akerman Senterfitt

(57) ABSTRACT

The invention relates to blue colored sodiocalcic glass. It contains 0.15 to 1.1 wt. % $Fe_2O_3$, has a redox that does not exceed 45%, exhibits a dominant wavelength ($\lambda_D$) in the range of 490 and 493 nm and a luminous transmission (TLA4) in addition to an excitation purity (P) satisfying the relation P>−0.3×TLA4+24.5. The inventive glass is particularly suitable for windscreens, side windows and rear-window defoggers in motor vehicles and glazing in buildings.

17 Claims, No Drawings

BLUE SODIOCALCIC GLASS

This application is a Continuation of U.S. patent application Ser. No. 09/914,043, filed Oct. 29, 2001 abandoned, which is a 371 of PCT/EP00/01394, filed Feb. 21, 2000, which claims priority to European Patent No. 99103543 7-2111, filed Feb. 24, 1999.

The present invention relates to a blue colored soda-lime glass composed of glass-forming principal constituents and of coloring agents.

The expression "soda-lime glass" is used here in the wide sense and relates to any glass which contains the following constituents (in percentages by weight):

| | |
|---|---|
| $Na_2O$ | 10 to 20% |
| CaO | 0 to 16% |
| $SiO_2$ | 60 to 75% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass is very widely used in the field of glazing for buildings or automobiles, for example. It is usually manufactured in the form of a ribbon by the float process. Such a ribbon can be cut into sheets which can then be bent or can undergo a treatment to improve their mechanical properties, for example a thermal toughening step.

It is generally necessary to relate the optical properties of a glass sheet to a standard illuminant. In the present description, 2 standard illuminants are used, namely illuminant C and illuminant A defined by the Commission Internationale de l'Eclairage (C.I.E.). Illuminant C represents average daylight having a color temperature of 6700 K. This illuminant is especially useful for evaluating the optical properties of glazing intended for buildings. Illuminant A represents the radiation of a Planck radiator with a temperature of about 2856 K. This illuminant describes the light emitted by car headlights and is essentially intended to evaluate the optical properties of windows intended for automobiles. The Commission Internationale de l'Eclairage has also published a document entitled "Colorimétrie, Recommandations Officielles de la C.I.E. [*Colorimetry and Official Recommendations of the C.I.E.*]" (May 1970) which describes a theory in which the calorimetric coordinates for light of each wavelength of the visible spectrum are defined so as to be able to be represented on a diagram having orthogonal axes x and y, called the C.I.E. chromaticity plot. This chromaticity plot shows the locus representative of light of each wavelength (expressed in nanometers) of the visible spectrum. This locus is called the "spectrum locus" and light whose coordinates lie on this spectrum locus is said to have 100% excitation purity for the appropriate wavelength. The spectrum locus is closed by a line called the purple boundary which connects the points of the spectrum locus whose coordinates correspond to wavelengths of 380 nm (violet) and 780 nm (red). The area lying between the spectrum locus and the purple boundary is that available for the chromaticity coordinates of any visible light. The coordinates of the light emitted by illuminant C, for example, correspond to x=0.3101 and y=0.3162. This point C is regarded as representing white light and consequently has an excitation purity equal to zero for any wavelength. Lines may be drawn from the point C to the spectrum locus at any desired wavelength and any point lying on these lines may be defined not only by its x and y coordinates but also as a function of the wavelength corresponding to the line on which it lies and as a function of its distance from the point C relative to the total length of the wavelength line. Consequently, the color of the light transmitted by a colored glass sheet may be described by its dominant wavelength and its excitation purity expressed as a percentage.

The C.I.E. coordinates of light transmitted by a colored glass sheet will depend not only on the composition of the glass but also on its thickness. In the present description, and in the claims, all the values of the excitation purity P and of the dominant wavelength $\lambda_D$ of the transmitted light are calculated from the spectral specific internal transmissions ($SIT_{\lambda}$) of a glass sheet 5 mm in thickness. The spectral specific internal transmission of a glass sheet is governed solely by the absorption of the glass and can be expressed by the Beer-Lambert law:

$SIT_{\lambda} = e^{-E \cdot A_{\lambda}}$ where $A_{\lambda}$ is the absorption coefficient (in $cm^{-1}$) of the glass at the wavelength in question and E is the thickness (in cm) of the glass. To a first approximation, $SIT_{\lambda}$ may also be represented by the formula:

$$(I_3 + R_2)/(I_1 - R_1)$$

where $I_1$ is the intensity of the visible light incident on a first face of the glass sheet, $R_1$ is the intensity of the visible light reflected by this face, $I_3$ is the intensity of the visible light transmitted from the second face of the glass sheet and $R_2$ is the intensity of the visible light reflected by this second face toward the interior of the sheet.

In the description which follows and in the claims, the following are also used:

for illuminant A, the total light transmission (TLA) measured for a thickness of 4 mm (TLA4). This total transmission is the result of the integration between the 380 and 780 nm wavelengths of the expression: $\Sigma T_{80} \cdot E_{80} \cdot S_{\lambda} / \Sigma E_{\lambda} \cdot S_{\lambda}$ in which $T_{\lambda}$ is the transmission at the wavelength $\lambda$, $E_{\lambda}$ is the spectral distribution of illuminant A and $S_{\lambda}$ is the sensitivity of the normal human eye as a function of the wavelength $\lambda$;

the total energy transmission (TE), measured for a thickness of 4 mm (TE4). This total transmission is the result of the integration between the 300 and 2500 nm wavelengths of the expression: $\Sigma T_{\lambda} \cdot E_{\lambda} / \Sigma E_{\lambda}$ in which $E_{\lambda}$ is the spectral energy distribution of the sun at 30° above the horizon;

the selectivity (SE), measured as the ratio of the total light transmission for illuminant A to the total energy transmission (TLA/TE);

the total transmission in the ultraviolet, measured for a thickness of 4 mm (TUV4). This total transmission is the result of the integration between 280 and 380 nm of the expression: $\Sigma T_{\lambda} \cdot U_{\lambda} / \Sigma U_{\lambda}$ in which $U_{\lambda}$ is the spectral distribution of the ultraviolet radiation that has passed through the atmosphere, defined in the DIN 67507 standard.

The redox ratio, which represents the value of the $Fe^{2+}$/total Fe ratio and is obtained by the formula:

$$Fe^{2+}/total\ Fe = [24.4495 \times log(92/\tau_{1050})]/t\text{-}Fe_2O_3$$

where $\tau_{1050}$ represents the specific internal transmission of the 5 mm-thick glass at the 1050 nm wavelength and t-$Fe_2O_3$ represents the total iron content expressed in $Fe_2O_3$ oxide form and measured by X-ray fluorescence.

The present invention relates in particular to blue glasses. These glasses can be used in architectural applications and as glazing for railway carriages and motor vehicles. In architectural applications, glass sheets 4 to 6 mm in thickness are generally used while in the motor-vehicle field thicknesses of 1 to 5 mm are normally employed, particularly for the production of monolithic glazing, and thicknesses of between 1 and 3 mm in the case of laminated glazing, especially for windshields, two glass sheets of this thickness then being bonded together by means of an interlayer film, generally made of polyvinyl butyral (PVB).

The present demand for blue glazing is focused on products having, for a given light transmission level, a pronounced coloration, that is to say a high excitation purity, even for high light transmission levels, while still providing moderate transmission levels for ultraviolet and infrared radiation.

Thus, FR 269 526 proposes blue glasses exhibiting these properties. However, they are only obtained at the cost of a high redox factor, of greater than 50%, which makes the glass highly heat-absorbant and consequently difficult to melt and to refine in conventional industrial furnaces, or of a high dominant wavelength of at least 494 nm, which corresponds, in particular for a glass having a high light transmission, to a shade of color tending toward green.

The invention eliminates these problematic drawbacks and provides a blue soda-lime colored glass composed of glass-forming principal components and of coloring agents, characterized in that it comprises from 0.15 to 1.1% by weight of $Fe_2O_3$, has a redox factor not exceeding 45% and presents a dominant wavelength ($\lambda_D$) of between 490 and 493 nm and a light transmission (TLA4) and an excitation purity (P) which satisfy the relationship P>−0.3×TLA4+ 24.5.

The glass according to the invention therefore has a high purity for a given light transmission and a pronounced blue shade of color, even for high light transmission levels, while still being able to be easily obtained in conventional industrial glass furnaces.

In addition, the glasses according to the invention have the advantage of combining a blue color with a high selectivity. A selectivity S>1.3 is easily attained. This property is particularly advantageous both for motor vehicle applications and architectural applications, since it makes it possible to limit the heating due to solar radiation and therefore to increase the thermal comfort of the occupants of the vehicle or of the building.

It is advantageous for the glass according to the invention to have a redox ratio of less than 40%, thereby making the glass particularly easy to produce.

Preferably, the glass according to the invention presents a light transmission of greater than or equal to 55%, which means that it can be used in most architectural applications or as vehicle windows.

This glass also preferably has a light transmission and an excitation purity which satisfy the relationship P>−0.3× TLA4+26.5, that is to say an even higher purity, for all light transmission levels. This clearly corresponds to the currently accepted criteria as regards esthetics.

Advantageously, the glass according to the invention presents a dominant wavelength of less than or equal to 492 nm, corresponding to a highly pronounced blue shade, particularly desirable from an esthetic standpoint. Likewise, esthetic considerations may make it desirable that the dominant wavelength of these glasses be greater than or equal to 491 nm, so that the shade of blue obtained is especially pleasing to the eye.

In certain forms of the invention, the glass presents a selectivity of at least 1.3, preferably at least 1.5. This makes it possible, for a given light transmission, to limit the heating of volumes bounded by windows using this glass.

Preferably, the glass according to the invention includes, as coloring agent, at least one of the elements chromium, cobalt, titanium, selenium, cerium, manganese and vanadium. The use of these elements allows the optical properties of the glass to be optimally adjusted and helps to obtain a glass having the desired shade and intensity of color.

Iron is present in most glasses existing on the market, either as an impurity or deliberately introduced as a coloring agent. The presence of $Fe^{3+}$ gives the glass a slight absorption of visible light of short wavelength (410 and 440 nm) and a very strong absorption band in the ultraviolet (absorption band centered on 380 nm), whereas the presence of $Fe^{2+}$ ions causes a strong absorption in the infrared (absorption band centered on 1050 nm). The ferric ions give the glass a slight yellow coloration, whereas the ferrous ions give a more pronounced blue-green coloration. All other considerations being equal, it is the $Fe^{2+}$ ions which are responsible for the absorption in the infrared range and which therefore determine TE. The value of TE decreases, thereby increasing the value of SE, as the concentration of $Fe^{2+}$ ions increases. By favoring the presence of $Fe^{2+}$ ions over $Fe^{3+}$ ions, a high selectivity is therefore obtained.

The effects of the various other coloring agents individually envisaged for producing a glass are the following (according to "Le Verre" [*Glass*] by H. Scholze, translated by J. Le Dû, Institut du Verre [*Glass Institute*], Paris):

Cobalt: the $Co^{II}O_4$ group produces an intense blue coloration with a dominant wavelength almost opposite to that produced by the iron-selenium chromophor.

Chromium: the presence of the $Cr^{III}O_6$ group gives rise to absorption bands at 650 nm and a light green color. More extensive oxidation gives rise to the $Cr^{VI}O_4$ group which creates a very intense absorption band at 365 nm and gives a yellow coloration.

Cerium: the presence of cerium ions in the composition makes it possible to obtain a strong absorption in the ultraviolet range. Cerium oxide exists in two forms: $Ce^{IV}$ absorbs in the ultraviolet around 240 nm and $Ce^{III}$ absorbs in the ultraviolet around 314 nm.

Selenium: the $Se^{4+}$ cation has virtually no coloring effect, whereas the uncharged element Se0 gives a pink coloration. The $Se^{2-}$ anion forms a chromophor with the ferric ions present and consequently gives the glass a brown-red color.

Vanadium: for increasing contents of alkali metal oxides, the color changes from green to colorless, this being caused by the oxidation of the $V^{III}O_6$ group into $V^{V}O_4$.

Manganese: appears in the glass in the form of practically colorless $Mn^{II}O_6$. The $Mn^{III}O_6$ group in glasses rich in alkali metals creates, however, a violet color.

Titanium: $TiO_2$ in the glasses gives them a yellow coloration. In large amounts, it is even possible to obtain, by reduction, the $Ti^{III}O_6$ group, which gives the glass a violet or even maroon color.

The energy and optical properties of a glass. containing several coloring agents are therefore the result of a complex interaction between them. This is because, the behavior of these coloring agents depends greatly on their redox state and therefore on the presence of other elements liable to influence this state.

Preferably, the glass according to the invention comprises less than 0.1% by weight of $TiO_2$. A higher amount of $TiO_2$ runs the risk of giving the glass a yellow coloration which goes counter to the shade desired here.

It is also preferable for the glass according to the invention to contain less than 0.5% by weight $CeO_2$ amongst its coloring agents, since this element, which absorbs radiation in the ultraviolet, can be used to reduce the transmission of the glass in this wavelength range, although it results in a shift in the dominant wavelength toward the green. This shift may be corrected by increasing the redox ratio of the glass, but with the result that the glass is difficult to melt, as indicated above. Moreover, Ce is a very expensive element and its use in the glass, even in amounts not exceeding 1% by weight of $CeO_2$, may double the cost of the batch materials needed for its manufacture.

Advantageously, the glass according to the invention comprises no more than 0.13% of $MnO_2$ among its coloring agents. $MnO_2$ has an oxidizing character which runs the risk of creating a green shade by modifying the redox state of the iron if it is used in a higher amount.

It is also desirable for this glass not to contain fluorocompounds among its coloring agents or at least for these not to represent more than 0.2% by weight of the glass. This is because these compounds give rise to discharges from the furnace which are environmentally very harmful and are, in addition, highly corrosive with respect to the blocks of refractory materials which line the inside of said furnace.

Moreover, it is preferred that the glass according to the invention be obtained from a mixture of principal glass-forming constituents with a concentration of MgO of greater than 2% since this compound encourages the melting of said constituents.

In preferred forms of the invention, the glass comprises the following percentages by weight of coloring agents, the total amount of iron being expressed in the form of $Fe_2O_3$:

$Fe_2O_3$ 0.3–1.1%
FeO 0.10–0.30%
Co 0–0.0040%
$Cr_2O_3$ 0–0.0500%
$V_2O_5$ 0–0.0500% and has the following optical properties:

55%<TLA4<85%

36%<TE4<60%

P<12%.

Glasses having such characteristics are particularly suitable for a large number of motor-vehicle and architectural applications. The optical properties obtained correspond to selective products, that is to say to products having, for a given light transmission level, a low energy transmission level. This limits the extent to which volumes bounded by glazing manufactured from such glasses are heated up. The transmission purity thus defined is also suitabale for such applications.

For certain applications of the invention, particularly in the motor vehicle field, it is preferable for the glasses according to the invention to have a light transmission of greater than 70%, the lower limit of the official standards relating to front side windows of cars, or 75%, in the case of vehicle windshields.

Glasses particularly suitable for the manufacture of motor vehicle glazing, in particular windshields, comprise the following percentages by weight of coloring agents, the total amount of iron being expressed in the form of $Fe_2O_3$:

$Fe_2O_3$ 0.3–0.7%
FeO 0.10–0.20%
Co 0–0.0020% and has the following optical properties:

72%<TLA4<85%

49%<TE4<60%

3%<P<9%.

Even more preferably, for such applications, the glass according to the invention comprises the following percentages by weight of coloring agents, the total amount of iron being expressed in the form of $Fe_2O_3$:

$Fe_2O_3$ 0.4–0.6%
FeO 0.11–0.16%
Co 0–0.0015% and has the following optical properties:

74%<TLA4<80%

51%<TE4<58%

3%<P<7%

$\lambda_D \leq 492$ nm.

For uses of the glass according to the invention as glazing for buildings or as front side windows of vehicles, it comprises the total amount of iron being expressed in the form of $Fe_2O_3$:

$Fe_2O_3$ 0.4–0.8%
FeO 0.16–0.23%
Co 0–0.0030% and has the following optical properties:

70%<TLA4<77%

39%<TE4<50%

4%<P<10%.

For such applications, it is particularly preferred that this glass. comprises the following percentages by weight of coloring agents, the total amount of iron being expressed in the form of $Fe_2O_3$:

$Fe_2O_3$ 0.55–0.75%
FeO 0.16–0.23%
Co 0–0.0020% and has the following optical properties:

70%<TLA4<74%

41%<TE4<48%

6%<P<9%

$\lambda_D \leq 492$ nm.

For applications of the glass according to the invention as rear side windows of vehicles and in certain architectural applications allowing lower light transmission, this going hand in hand with a reduction in the energy transmission of the window, which may be extremely valuable in hot climates, this glass advantageously has a light transmission (TLA4) of less than 70%.

In this case, it is possible and preferable, for reasons of ease of manufacture and for reasons of reducing the cost of the batch materials needed for this manufacture, for the glass according to the invention to comprise less than 0.01%, preferably less than 0.0050%, by weight of $V_2O_5$ and less than 0.0020%, preferably less than 0.0015%, by weight of $Cr_2O_3$.

For these applications it is preferred that the glass according to the invention comprises the following percentages by weight of coloring agents, the total amount of iron being expressed in the form of $Fe_2O_3$:

$Fe_2O_3$ 0.6–1.1%
FeO 0.20–0.30%
Co 0–0.0040% and has the following optical properties:

55%<TLA4<69%

30%<TE4<47%

6%<P<12%.

Even more preferably, for the same applications, the glass according to the invention comprises the following percentages by weight of coloring agents, the total amount of iron being expressed in the form of $Fe_2O_3$:

$Fe_2O_3$ 0.75–0.95%
FeO 0.22–0.28%
Co 0–0.0030% and has the following optical properties:

63%<TLA4<69%

36%<TE4<45%

7%<P<11%

$\lambda_D$<492 nm.

The light transmission range thus defined makes the glass according to the invention particularly useful for preventing the dazzling effect of the light from motor vehicle headlights when it is used for rear side windows or as rear windows of vehicles. The corresponding energy transmission range gives the glass its high selectivity.

For the purpose of making it easier to melt the glasses according to the invention, it is desirable for them to comprise amongst their coloring agents less than 1.0% by weight of $Fe_2O_3$.

The glass according to the invention may be coated with a layer of metal oxides which reduce the extent to which it is heated up by solar radiation and consequently the extent to which the passenger compartment of a vehicle using such glass as glazing is heated up.

The glasses according to the invention can be manufactured by conventional processes. As batch materials, it is possible to use natural materials, recycled glass, slag or a combination of these materials. The colorants are not necessarily added in the form indicated, but this way of giving the amounts of coloring agents added, in equivalents in the forms indicated, corresponds to the standard practice. In practice, the iron is added in the form of red iron oxide, the cobalt is added in the form of the hydrated sulfate, such as $CoSO_4.7H_2O$ or $CoSO_4.6H_2O$, and the chromium is added in the form of the dichromate such as $K_2Cr_2O_7$. The cerium is introduced in the form of the oxide or carbonate. As regards the vanadium, this is introduced in the form of the oxide or of sodium vanadate. The selenium, when it is present, is added in elemental form or in the form of the selenite such as $Na_2SeO_3$ or $ZnSeO_3$.

Other elements are sometimes present as impurities in the batch materials used to manufacture the glass according to the invention, whether in natural materials, in recycled glass or in slag, but when these impurities do not give the glass properties lying outside the limits defined above, these glasses are regarded as being in accordance with the present invention. The present invention will be illustrated by the following specific examples of optical properties and compositions

EXAMPLES 1 TO 59

Table I gives by way of non-limiting indication the base composition of the glass and the constituents of the batch to be melted in order to produce the glasses according to the invention. Table II gives the proportions of coloring agents and the optical properties of glasses according to the invention. Table III gives by way of comparison with the glasses of the invention examples of blue glasses tending toward green. The abovementioned proportions are determined by X-ray fluorescence of the glass and converted into the molecular species indicated.

The batch may, if necessary, contain a reducing agent such as coke, graphite, slag or an oxidizing agent such as a nitrate. In this case, the proportions of the other materials are adapted so that the composition of the glass remains unchanged.

TABLE I

| Composition of the base glass | | Constituents of the base glass | |
|---|---|---|---|
| $SiO_2$ | 71.5 to 71.9% | Sand | 571.3 |
| $Al_2O_3$ | 0.8% | Feldspar | 29.6 |
| CaO | 8.8% | Lime | 35.7 |
| MgO | 4.2% | Dolomite | 167.7 |
| $Na_2O$ | 14.1% | $Na_2CO_3$ | 189.4 |
| $K_2O$ | 0.1% | Sulfate | 5.0 |
| $SO_3$ | 0.05 to 0.45% | | |

TABLE II

| Ex. No. | $Fe_2O_3$ (%) | FeO (%) | Redox (%) | Co (ppm) | TLA4 (%) | TE4 (%) | TUV4 (%) | SE4 | $\lambda_D$ (nm) | P (%) |
|---|---|---|---|---|---|---|---|---|---|---|
| 1 | 0.89 | 0.22 | 27.8 | 20 | 63.8 | 40.3 | 16.5 | 1.58 | 491.3 | 8.7 |
| 2 | 0.87 | 0.26 | 33.2 | 19 | 62.2 | 37.4 | 17.6 | 1.66 | 490.3 | 10.3 |
| 3 | 0.62 | 0.14 | 25.2 | 17 | 72.4 | 52.2 | 25.8 | 1.38 | 490.3 | 6.5 |
| 4 | 0.76 | 0.21 | 31.0 | 16 | 66.2 | 42.3 | 20.2 | 1.56 | 490.2 | 9.0 |
| 5 | 0.38 | 0.08 | 23.6 | 9 | 80.3 | 64.5 | 36.5 | 1.24 | 490.0 | 4.2 |
| 6 | 0.39 | 0.08 | 24.5 | 8 | 79.7 | 63.1 | 35.1 | 1.26 | 490.3 | 4.4 |
| 7 | 0.51 | 0.12 | 27.1 | 7 | 76.6 | 56.2 | 30.8 | 1.36 | 491.0 | 5.3 |
| 8 | 0.40 | 0.08 | 22.7 | 5 | 81.5 | 64.8 | 35.3 | 1.25 | 492.9 | 3.3 |
| 9 | 0.50 | 0.13 | 28.6 | 4 | 77.7 | 55.8 | 30.8 | 1.39 | 492.3 | 4.9 |
| 10 | 0.50 | 0.12 | 26.6 | 10 | 76.9 | 56.8 | 31.4 | 1.35 | 490.2 | 5.3 |

TABLE II-continued

| Ex. No. | Fe$_2$O$_3$ (%) | FeO (%) | Redox (%) | Co (ppm) | TLA4 (%) | TE4 (%) | TUV4 (%) | SE4 | $\lambda_D$ (nm) | P (%) |
|---|---|---|---|---|---|---|---|---|---|---|
| 11 | 0.50 | 0.118 | 26.2 | 6 | 78.2 | 57.5 | 31.4 | 1.36 | 492.2 | 4.4 |
| 12 | 0.48 | 0.118 | 27.3 | 4 | 78.9 | 57.8 | 32.2 | 1.36 | 492.5 | 4.3 |
| 13 | 0.56 | 0.132 | 26.1 | 8 | 76.2 | 54.9 | 29.0 | 1.38 | 492.0 | 5.0 |
| 14 | 0.56 | 0.132 | 26.1 | 12 | 75.0 | 54.5 | 29.0 | 1.37 | 490.3 | 5.8 |
| 15 | 0.50 | 0.134 | 29.7 | 5 | 77.3 | 55.3 | 31.5 | 1.39 | 491.4 | 5.2 |
| 16 | 0.49 | 0.125 | 28.3 | 7 | 77.4 | 56.4 | 31.8 | 1.37 | 490.9 | 5.2 |
| 17 | 0.48 | 0.125 | 28.9 | 4 | 78.4 | 56.7 | 32.2 | 1.38 | 491.9 | 4.7 |
| 18 | 0.55 | 0.142 | 28.6 | 4 | 76.7 | 54.1 | 29.5 | 1.41 | 492.9 | 4.9 |
| 19 | 0.56 | 0.167 | 33.1 | 4 | 75.0 | 50.8 | 29.2 | 1.47 | 491.5 | 6.1 |
| 20 | 0.55 | 0.18 | 36.3 | 4 | 74.2 | 49.1 | 29.6 | 1.51 | 490.9 | 7.0 |
| 21 | 0.57 | 0.18 | 35.0 | 6 | 73.5 | 48.9 | 28.8 | 1.50 | 490.4 | 7.0 |
| 22 | 0.50 | 0.135 | 30.0 | 4 | 77.5 | 55.2 | 31.5 | 1.40 | 491.8 | 5.1 |
| 23 | 0.48 | 0.13 | 30.0 | 6 | 77.4 | 55.8 | 32.3 | 1.38 | 490.4 | 5.7 |
| 24 | 0.46 | 0.13 | 31.4 | 4 | 78.0 | 55.9 | 33.1 | 1.39 | 491.1 | 5.4 |
| 25 | 0.46 | 0.13 | 31.4 | 6 | 77.5 | 55.7 | 33.1 | 1.39 | 490.1 | 5.7 |
| 26 | 0.80 | 0.2 | 27.7 | 14 | 67.2 | 44.8 | 19.9 | 1.49 | 491.7 | 7.7 |
| 27 | 0.80 | 0.2 | 27.7 | 19 | 65.7 | 44.3 | 20.0 | 1.48 | 490.4 | 8.7 |
| 28 | 0.79 | 0.22 | 30.9 | 16 | 65.8 | 43.0 | 20.5 | 1.52 | 490.3 | 8.7 |
| 29 | 0.78 | 0.23 | 32.7 | 12 | 66.6 | 42.6 | 20.9 | 1.56 | 491.1 | 8.6 |
| 30 | 0.78 | 0.23 | 32.7 | 6 | 68.4 | 43.2 | 20.9 | 1.58 | 492.8 | 7.4 |
| 31 | 0.85 | 0.27 | 35.3 | 6 | 65.8 | 38.8 | 18.2 | 1.69 | 492.7 | 8.3 |
| 32 | 0.85 | 0.27 | 35.3 | 11 | 64.3 | 38.3 | 18.2 | 1.68 | 491.4 | 9.3 |
| 33 | 0.85 | 0.26 | 33.9 | 15 | 63.6 | 38.7 | 18.2 | 1.64 | 490.9 | 9.5 |
| 34 | 0.85 | 0.28 | 36.6 | 15 | 62.7 | 37.0 | 18.3 | 1.69 | 490.3 | 10.0 |
| 35 | 0.90 | 0.28 | 34.5 | 15 | 62.2 | 36.4 | 16.2 | 1.70 | 491.0 | 10.0 |
| 36 | 0.65 | 0.16 | 27.3 | 15 | 71.2 | 49.5 | 24.6 | 1.43 | 490.4 | 7.0 |
| 37 | 0.66 | 0.16 | 26.9 | 12 | 72.0 | 49.6 | 24.2 | 1.45 | 491.6 | 6.3 |
| 38 | 0.67 | 0.17 | 28.1 | 14 | 70.8 | 48.2 | 23.8 | 1.46 | 490.3 | 6.9 |
| 39 | 0.64 | 0.18 | 31.0 | 14 | 70.4 | 47.4 | 24.9 | 1.48 | 490.3 | 7.8 |
| 40 | 0.60 | 0.17 | 31.4 | 10 | 72.6 | 49.3 | 26.7 | 1.47 | 490.2 | 7.1 |
| 41 | 0.60 | 0.17 | 31.4 | 4 | 74.3 | 49.8 | 26.6 | 1.49 | 492.7 | 5.7 |
| 42 | 0.65 | 0.19 | 32.4 | 4 | 72.8 | 47.2 | 24.7 | 1.54 | 492.9 | 6.2 |
| 43 | 0.64 | 0.2 | 34.7 | 9 | 70.8 | 45.7 | 25.1 | 1.54 | 490.4 | 8.0 |
| 44 | 0.70 | 0.22 | 34.9 | 4 | 70.7 | 43.6 | 22.8 | 1.62 | 492.6 | 7.0 |
| 45 | 0.62 | 0.17 | 30.4 | 14 | 71.2 | 48.7 | 25.8 | 1.46 | 490.2 | 7.7 |
| 46 | 0.71 | 0.19 | 29.7 | 8 | 71.0 | 46.2 | 22.2 | 1.53 | 492.7 | 6.4 |
| 47 | 0.98 | 0.255 | 28.9 | 15 | 62.5 | 36.7 | 13.2 | 1.70 | 492.7 | 8.5 |
| 48 | 0.98 | 0.27 | 30.6 | 18 | 61.1 | 35.3 | 13.3 | 1.72 | 491.6 | 9.6 |
| 49 | 1.05 | 0.27 | 28.5 | 18 | 60.1 | 33.8 | 10.5 | 1.77 | 492.4 | 9.2 |
| 50 | 1.07 | 0.3 | 31.1 | 22 | 57.5 | 31.0 | 9.78 | 1.85 | 491.2 | 10.8 |
| 51 | 1.08 | 0.33 | 33.9 | 20 | 57.0 | 29.0 | 9.45 | 1.96 | 491.3 | 11.2 |
| 52 | 1.08 | 0.34 | 34.9 | 25 | 55.1 | 27.8 | 9.48 | 1.98 | 490.4 | 12.4 |

TABLE III

| Ex. No. | Fe$_2$O$_3$ (%) | FeO (%) | Redox (%) | Co (ppm) | TLA4 (%) | TE4 (%) | TUV4 (%) | SE4 | $\lambda_D$ (nm) | P (%) |
|---|---|---|---|---|---|---|---|---|---|---|
| 53 | 0.38 | 0.08 | 23.1 | 4 | 82.0 | 65.4 | 36.7 | 1.25 | 493.3 | 3.0 |
| 54 | 0.52 | 0.118 | 25.2 | 4 | 78.6 | 57.5 | 30.6 | 1.36 | 493.8 | 3.8 |
| 55 | 0.55 | 0.132 | 26.6 | 4 | 77.4 | 55.4 | 29.4 | 1.39 | 493.7 | 4.3 |
| 56 | 0.80 | 0.2 | 27.7 | 8 | 68.9 | 45.4 | 19.9 | 1.51 | 493.7 | 6.5 |
| 57 | 0.86 | 0.25 | 32.3 | 6 | 66.6 | 40.3 | 17.7 | 1.65 | 493.5 | 7.5 |
| 58 | 0.65 | 0.16 | 27.3 | 6 | 73.9 | 50.3 | 24.6 | 1.46 | 493.8 | 5.2 |
| 59 | 0.95 | 0.25 | 29.2 | 12 | 64.0 | 38.0 | 14.4 | 1.68 | 493.3 | 7.9 |

The invention claimed is:

1. A blue soda-lime colored glass composed of glass-forming principal components and of coloring agents, characterized in that it comprises from 0.15 to 1.1% by weight of Fe$_2$O$_3$, has a redox factor not exceeding 45% and presents a dominant wavelength ($\lambda_D$) of between 491 and 493 nm, including the endpoints of that range, and a light transmission (TLA4) and an excitation purity (P) which satisfy the relationship P>−0.3×TLA4+24.5 and comprises amongst its coloring agents less than 0.1% by weight of TiO$_2$.

2. The colored glass as claimed in claim 1 and further including at least one of the following features (A) through (D)

(A) a light transmission (TLA4) of greater than or equal to 55%;
(B) a light transmission (TLA4) and an excitation purity (P) which satisfy the relationship P>−0.3×TLA4+26.5;
(C) as coloring agents, a compound of at least one of the elements Cr, Ce, Co, Se, V, Ti, Mn; and
(D) it comprises the following percentages by weight of coloring agents, the total amount of iron being expressed in the form of Fe$_2$O$_3$:
Fe$_2$O$_3$ 0.3–1.1%
FeO 0.10–0.30%
Co 0–0.0040%
Cr$_2$O$_3$ 0–0.0500%
V$_2$O$_5$ 0–0.0500% and has the following optical properties:

55%<TLA4<85%

36%<TE4<60%

P<12%.

3. The colored glass as claimed in claim 2 and further including at least two of the features (A) through (D).

4. The colored glass as claimed in claim 2 and further including all of the features (A) through (D).

5. The colored glass as claimed in claim 1 and further including at least one of the following features (E) and (F):
(E) it comprises less than 0.5% by weight of $CeO_2$;
(F) it comprises less than 0.13% by weight of $MnO_2$.

6. The colored glass as claimed in claim 1, characterized in that it has a light transmission (TLA4) of greater than or equal to 70%.

7. The colored glass as claimed in claim 2 wherein it further comprises one of the following features (G) through (J):
(G) the following percentages by weight of coloring agents, the total amount of iron being expressed in the form of $Fe_2O_3$:
$Fe_2O_3$ 0.3–0.7%
FeO 0.10–0.20%
Co 0–0.0020%
and has the following optical properties:

72%<TLA4<85%

49%<TE4<60%

3%<P<9%;

(H) the following percentages by weight of coloring agents, the total amount of iron being expressed in the form of $Fe_2O_3$:
$Fe_2O_3$ 0.4–0.6%
FeO 0.11–0.16%
Co 0–0.0015%
and has the following optical properties:

74%<TLA4<80%

51%<TE4<58%

3%<P<7%

$\lambda_D$<492 nm;

(I) the following percentages by weight of coloring agents, the total amount of iron being expressed in the form of $Fe_2O_3$:
$Fe_2O_3$ 0.4–0.8%
FeO 0.16–0.23%
Co 0–0.0030%
and has the following optical properties:

70%<TLA4<77%

39%<TE4<50%

4%<P<10%; or (J) the following percentages by weight of coloring agents, the total amount of iron being expressed in the form of $Fe_2O_3$:
$Fe_2O_3$ 0.55–0.75%
FeO 0.16–0.23%
Co 0–0.0020%
and has the following optical properties:

70%<TLA4<74%

41%<TE4<48%

6%<P<9%

$\lambda_D$<492 nm.

8. The colored glass as claimed in claim 1, characterized in that it has a light transmission (TLA4) of less than 70%.

9. The colored glass as claimed in claim 1, further characterized by one of the following (K) through (M):
(K) it comprises less than 0.01%, preferably less than 0.0050%, by weight of $V_2O_5$ and less than 0.0020%, preferably less than 0.0015%, by weight of $Cr_2O_3$;
(L) it comprises the following percentages by weight of coloring agents, the total amount of iron being expressed in the form of $Fe_2O_3$:
$Fe_2O_3$ 0.6–1.1%
FeO 0.20–0.30%
Co 0–0.0040%
and has the following optical properties:

55%<TLA4<69%

30%<TE4<47%

6%<P<12%;

(M) it comprises the following percentages by weight of coloring agents, the total amount of iron being expressed in the form of $Fe_2O_3$:
$Fe_2O_3$ 0.75–0.95%
FeO 0.22–0.28%
Co 0–0.0030%
and has the following optical properties:

63%<TLA4<69%

36%<TE4<45%

7%<P<11%

$\lambda_D$<492 nm.

10. The colored glass as claimed in claim 1, characterized in that it forms a motor-vehicle window.

11. The colored glass as claimed in claim 1 further characterized by a dominant wavelength ($\lambda_D$) of less than or equal to 492 nm.

12. The colored glass as claimed in claim 1 further characterized in that it comprises less than 1.0% by weight of $Fe_2O_3$.

13. A blue soda-lime colored glass composed of glass-forming principal components and of coloring agents, characterized in that it comprises from 0.15 to 1.1% by weight of $Fe_2O_3$, has a redox factor not exceeding 45% and presents a dominant wavelength ($\lambda_D$) of between 490 and 493 nm and a light transmission (TLA4) and an excitation purity (P) which satisfy the relationship P>−0.3×TLA4+24;

further comprising the following percentages by weight of coloring agents, the total amount of iron being expressed in the form of $Fe_2O_3$:
$Fe_2O_3$ 0.3–1.1%
FeO 0.10–0.30%
Co 0–0.0040%
$Cr_2O_3$ 0–0.0500%
$V_2O_5$ 0–0.0500% and has the following optical properties:

55%<TLA4<85%

36%<TE4<60%

P<12%; and the colored glass has a light transmission (TLA4) of less than 70%.

14. A blue soda-lime colored glass composed of glass-forming principal components and of coloring agents, characterized in that it comprises from 0.15 to 1.1% by weight of $Fe_2O_3$, has a redox factor not exceeding 45% and presents a dominant wavelength ($\lambda_D$) of between 490 and 493 nm and a light transmission (TLA4) and an excitation purity (P) which satisfy the relationship P>−0.3×TLA4+24.5; and further comprising the following percentages by weight of coloring agents, the total amount of iron being expressed in the form of $Fe_2O_3$:
 $Fe_2O_3$ 0.3–0.7%
 FeO 0.10–0.20%
 Co 0–0.0020%
and having the following optical properties:

72%<TLA4<85%

49%<TE4<60%

3%<P<9%.

15. A blue soda-lime colored glass composed of glass-forming principal components and of coloring agents, characterized in that it comprises from 0.15 to 1.1% by weight of $Fe_2O_3$, has a redox factor not exceeding 45% and presents a dominant wavelength ($\lambda_D$) of between 490 and 493 nm and a light transmission (TLA4) and an excitation purity (P) which satisfy the relationship P>−0.3×TLA4+24.5; and further comprising the following percentages by weight of coloring agents, the total amount of iron being expressed in the form of $Fe_2O_3$:
 $Fe_2O_3$ 0.4–0.8%
 FeO 0.16–0.23%
 Co 0–0.0030%
and having the following optical properties:

70%<TLA4<77%

39%<TE4<50%

4%<P<10%.

16. A blue soda-lime colored glass composed of glass-forming principal components and of coloring agents, characterized in that it comprises from 0.15 to 1.1% by weight of $Fe_2O_3$, has a redox factor not exceeding 45% and presents a dominant wavelength ($\lambda_D$) between 491 and 493 nm, including the endpoints of that range, and a light transmission (TLA4) and an excitation purity (P) which satisfy the relationship P>−0.3×TLA4+24.5, while TLA4 is greater or equal to 65.7, and comprises its coloring agents less than 0.1% by weight of $TiO_2$.

17. A blue soda-lime colored glass composed of glass-forming principal components and of coloring agents, characterized in that it comprises from 0.15 to 1.1% by weight of $Fe_2O_3$, has a redox factor not exceeding 45% and presents a dominant wavelength ($\lambda_D$) between 491 and 493 nm, including the endpoints of that range, and a light transmission (TLA4) and an excitation purity (P) which satisfy the relationship P>−0.3×TLA4+24.5, while TLA4 is greater or equal to 72.07, and comprises amongst its coloring agents less than 0.1% by weight of $TiO_2$.

* * * * *